United States Patent [19]

Stradella

[11] Patent Number: 4,507,961

[45] Date of Patent: Apr. 2, 1985

[54] LEVEL GAUGE FOR LIQUEFIED GAS TANKS, WITH DIAL-AND-HAND INDICATOR ACTUATED BY AN AXIALLY MOVABLE DRIVE COUPLED WITH A SINGLE INTERNAL MAGNET

[76] Inventor: Fabio Stradella, 1/8 Via J. Ruffini, 16032 Camogli (Genova), Italy

[21] Appl. No.: 447,514

[22] Filed: Dec. 7, 1982

[30] Foreign Application Priority Data

Dec. 7, 1981 [IT] Italy .................. 12701 A/81

[51] Int. Cl.³ .......................................... G01F 23/12
[52] U.S. Cl. ...................... 73/317; 73/DIG. 5; 116/229
[58] Field of Search ............... 73/314, 317, DIG. 5; 116/317, 332, 229

[56] References Cited

U.S. PATENT DOCUMENTS

| | | | |
|---|---|---|---|
| 2,228,497 | 1/1941 | Witchger | 116/332 |
| 2,289,295 | 7/1942 | Phaneuf | 73/317 |
| 2,697,350 | 12/1954 | Sorber | 73/317 |
| 3,177,715 | 4/1965 | Clark et al. | 73/317 |
| 3,977,248 | 8/1976 | Metzger | 116/204 |

FOREIGN PATENT DOCUMENTS 1040495 10/1953 France .................. 73/DIG. 5

*Primary Examiner*—Charles Frankfort
*Assistant Examiner*—W. Morris Worth
*Attorney, Agent, or Firm*—Jacobs & Jacobs

[57] ABSTRACT

Safety level gauge for liquified gas tanks, of simplified construction and adapted for mass-production, operated by an internal, small-sized drive system provided with a single vertically-moveable magnetic element moved by a slender rod which is guided in a tubular member carrying at the lower end thereof a fork-shaped member having pivoted thereto a cam which is connected to a rocker-arm provided with a float at the free end thereof, and an external graduated dial mounted on a suitably-adapted valve body, dial comprising a freely-rotatable central spindle with an indicating hand and a cross-shaped member incorporating a needle constituting a ferrous member which is magnetically affected an indirectly actuated by the internal element which is moved by the float and attendant drive system.

6 Claims, 5 Drawing Figures

LEVEL GAUGE FOR LIQUEFIED GAS TANKS, WITH DIAL-AND-HAND INDICATOR ACTUATED BY AN AXIALLY MOVABLE DRIVE COUPLED WITH A SINGLE INTERNAL MAGNET

BACKGROUND OF THE INVENTION

The liquid level gauge according to the invention aims to achieve, with a simpler construction, smaller size and lower cost, the control of level changes of the liquid in a liquefied gas tank. Heretofore, this control has been difficult, particularly in case of relatively small tanks or bottles, as the existing devices, even if comprising magnetic elements, are very clumsy due to the use of rotating drive members, rocker arms with floats and pivoted counterweights for the drive rod or the like. Also, a system is known wherein the movement of a float is transmitted from the inside to the outside by means of two magnetic pastille-shaped elements disposed at a pre-established inclination, one inside and the other outside; however, this system entails a complicated and expensive construction. Therefore, this problem has not yet been solved in a simple, dependable and economic manner, i.e. with a device adapted for industrial mass-production and extensive marketing together with the valves used in this field, said valves constituting, after suitable modifications, the supporting member for said device. The level gauge according to the invention solves this problem satisfactorily in that it comprises a float having a rocker arm with no counterweight and a control cam with a single pivot, and the magnetic actuation of the external dial-and-hand indicator is effected by a single internal cylindrical magnetic element (made from a bar) actuating, rather than a second magnetic element, a small-sized cross-shaped member mounted on the freely rotatable spindle of the indicating hand and having a needle-shaped ferrous member (preferably made of steel), so as to ensure, despite of the single construction thereof, a reliable operation even for many years.

BRIEF DESCRIPTION OF THE DRAWING

The accompanying drawing shows, by way of illustrating and non-limiting example, a preferred basic embodiment of a valve for a tank or bottle of liquefied gas, incorporating an embodiment of gauge device according to the invention. In the drawing.

DESCRIPTION OF THE PREFERRED EMBODIMENT

Figure 1:
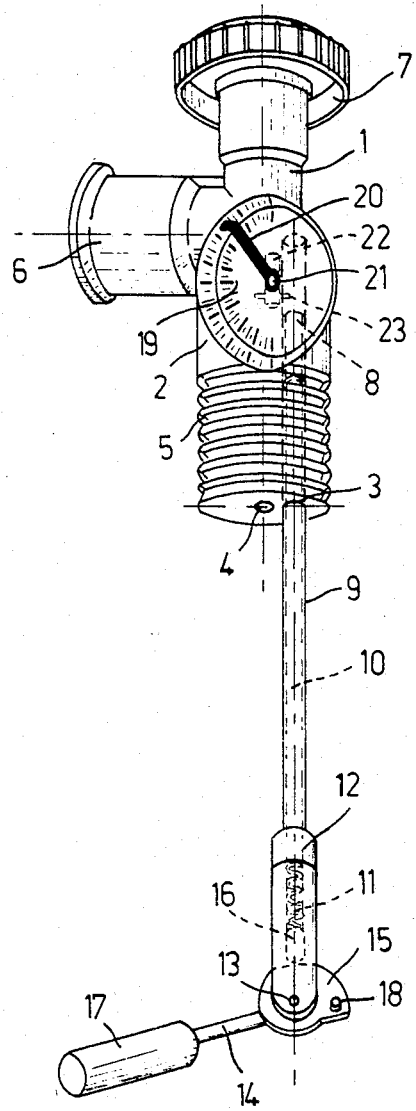
FIG. 1 is a perspective general view of the device.

With particular reference to FIG. 1, the body 1 of a valve for liquefied gas bottles, usually made of molded bronze, is very similar to a conventional valve body, the only difference being that it is provided with a blank flange 2, formed in the molding step, and an offset blind hole 3 which is parallel to the axial duct 4 for the gas outflow. The valve body also comprises a threaded male connection 5, a female threaded connection 6 for the gas outflow and a control handwheel 7. Slidably mounted within the blind hole 3 is a cylindrical magnetic element 8 (permanent magnet), and fixed at the mouth of the blind hole is an elongated tubular member 9 of any desired length depending upon the tank where the gauge is to be mounted. It is to be noted that the magnetic element is purposely of cylindrical shape (e.g., having a diametre of only 4 mm.) and is not of disc-shape, so as to be obtainable from a bar at a reduced cost and to be also of small dimensions. A slender drive rod 10 and a small coil return spring 11 are threaded into the tubular member 9, whereafter an end fork-shaped member 12 is fixed to the lower end of the tubular member 9, the latter having pivoted thereto, by a fulcrum-pivot 13, a rocker-arm 14 capable of assuming a vertical position and provided with a cam 15 to actuate the rod 10. The latter is provided with a cup-shaped cam follower 16 at its lower end. A cylindrical float 17 of a diameter smaller than the diameter of the orifice of the tank or bottle can be secured to the free end of the rocker-arm 14. The use of a counterweight has been avoided puposely, because it would complicate the introduction of the assembly into the tank, and a small peg is merely provided on the cam 15 to limit the stroke thereof.

The unit indicating the level of the liquid in the bottle is secured on the outer surface of the blank flange 2 by setting it into a suitable marginal ridge thereof. Therefore, this unit is completely separated from the inside of the tank. The indicating means comprises a cup-shaped dial 19 provided with a rotatable indicating hand 20 and spindle 21, said spindle fixedly mounting near the rear end thereof a cross-shaped member 22 made of plastics and incorporating a needle 23 which acts as a ferrous means liable to be acted upon by the magnetic field of the internal magnetic element 8 slidable at the back side of the blank flange 2. The unit is covered by a suitable protective cup-shaped member of transparent plastics material.

Figure 2:
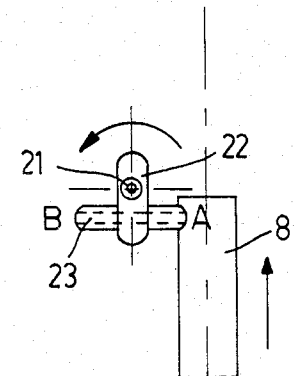
FIG. 2 is a diagrammatic fragmentary view of the indirect magnetic coupling between the internal magnetic element and the external cross-shaped member which is mounted on the spindle of the indicating hand, the assembly being shown in the lower position at the beginning of its stroke.
Figure 3:
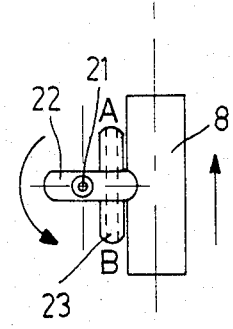
FIG. 3 is a view similar to FIG. 2, with the assembly in the intermediate position thereof.
Figure 4:
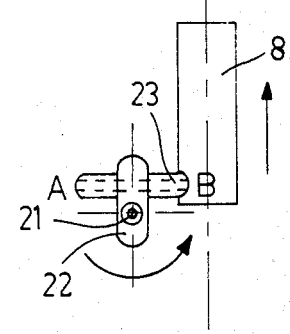
FIG. 4 is a view similar to FIG. 2, with the assembly in the upper position at the end of its stroke, that is when the cross-shaped member has effected a 180° rotation.
Figure 5:
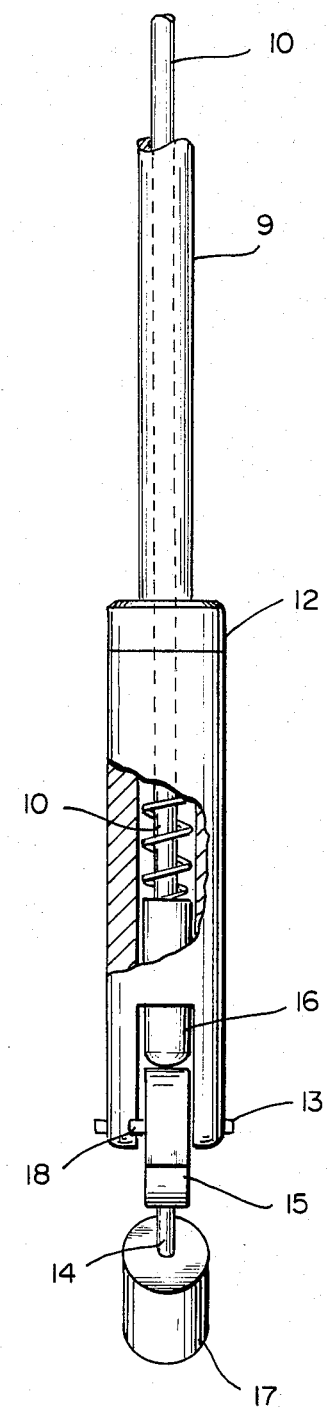
FIG. 5 is a detailed side view, partly in section, of the fork-shaped member shown in FIG. 1.

The gauge device operates as follows: When the float 17 is raised, the cam 15 rotates about its fulcrum 13 and thus moves the drive rod 10 upwards. The latter, in turn, lifts the internal magnetic element 8 that, by means of its magnetic flux directed towards the ferrous needle 23 of the member 22 on the spindle 21, causes on the outside the movement of the indicating hand 20. This movement is better shown, sequentially, in FIGS. 2, 3 and 4. The magnetic element 8 acts, first, on the end portion A of the needle 23, thereby rotating the cross-shaped member 22, as indicated by the arrow, to the intermediate position of FIG. 3. The continued movement of the magnetic element 8 will cause the opposite end portion B of the needle 23 to be attracted to effect the maximum 180° rotation of the member 22 to the position shown in FIG. 4. In a preferred embodiment and as shown in FIG. 1, the free end of the indicating hand is bent through about 45° to follow the cup-shaped contour of the dial 19, which permits the imprinting of a dual graduation, namely a side and a front graduation, so as to permit either a side or a front reading, as the case may be, which is particularly useful in case of conventional vertical bottles that are usually provided with an upper protective collar preventing a front reading.

It is to be noted that the inventive principle can also be used to obtain a gauge of the specified type, provided with an indicating unit which is disposed normal to the axis of the assembly. In this instance, since the magnetic element 8 is disposed transverse to the axis of the drive rod 10, the latter acts on the magnetic element through a small auxiliary rocker-arm.

Obviously, other changes and improvements are possible within the basic principle of the invention, which is based on the use of a single magnetic element of cylindrical shape and reduced diameter.

I claim:

1. A gauge for monitoring the level of a liquid, which comprises a housing; rod means mounted for vertical movement within said housing and operable to move as the level of the liquid changes; a vertically disposed, elongated magnet fixedly mounted at an upper end of said rod means; a spindle supported by said housing and mounted for rotation about a horizontal axis, said horizontal axis being spaced from said rod means; an indicator means operatively connected to said spindle; and operating means movable between first and second positions for rotating said spindle in response to movement of said rod means, said operating means comprising an elongated nonmagnetic ferrous member, and an arm connecting said spindle to said ferrous member; said magnet being operable to hold said ferrous member by magnetic attraction and thereby move said operating means between said positions in accordance with said movement of said rod means to thereby rotate said spindle.

2. A gauge according to claim 1, wherein said rod means and said magnet are mounted for movement within a bore inside of said housing, and said spindle and said operating means are supported outside of said housing.

3. A gauge according to claim 1, wherein said operating means has two plastic arms forming a cross, and said ferrous member is located inside one arm of said cross and the other arm is connected to said spindle.

4. A gauge according to claim 1, wherein a first end of said ferrous member is adjacent said magnet when said operating means is in said first position and a second end of said ferrous member is adjacent said magnet when said operating means is in said second position, said magnet being operable to first hold said first end and then said second end of said ferrous member as said rod means moves said magnet.

5. A gauge according to claim 2, wherein a first end of said ferrous member is adjacent said magnet when said operating means is in said first position and a second end of said ferrous member is adjacent said magnet when said operating means is in said second position, said magnet being operable to first hold said first end and then said second end of said ferrous member as said rod means moves said magnet.

6. A gauge according to claim 3, wherein a first end of said ferrous member is adjacent said magnet when said operating means is in said first position and a second end of said ferrous member is adjacent said magnet when said operating means is in said second position, said magnet being operable to first hold said first end and then said second end of said ferrous member as said rod means moves said magnet.

* * * * *